(12) United States Patent
Zernach et al.

(10) Patent No.: US 9,220,932 B2
(45) Date of Patent: *Dec. 29, 2015

(54) FIRE STOP SYSTEM

(71) Applicant: Panduit Corp., Tinley Park, IL (US)

(72) Inventors: Gary L. Zernach, Cumming, GA (US); Joseph Allen Dukes, Sugar Hill, GA (US); Travis M. Samples, Dawsonville, GA (US); Scott M. Younghouse, Cumming, GA (US); Nathan W. Pascarella, Buford, GA (US); John G. Duffield, Flowery Branch, GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,039

(22) Filed: Aug. 11, 2014

(65) Prior Publication Data

US 2014/0367127 A1 Dec. 18, 2014

Related U.S. Application Data

(63) Continuation of application No. 13/178,254, filed on Jul. 7, 2011, now Pat. No. 8,833,478.

(60) Provisional application No. 61/363,811, filed on Jul. 13, 2010.

(51) Int. Cl.
*A62C 2/06* (2006.01)
*A62C 3/16* (2006.01)
(Continued)

(52) U.S. Cl.
CPC . *A62C 2/065* (2013.01); *A62C 3/16* (2013.01); *F16L 5/04* (2013.01); *H02G 3/0412* (2013.01)

(58) Field of Classification Search
CPC ............. A62C 2/065; A62C 3/16; F16L 5/04; H02G 3/0412
USPC .................. 169/48, 51; 174/92, 93, 483, 650; 52/232, 565.3
See application file for complete search history.

(56) References Cited

U.S. PATENT DOCUMENTS 1,678,715 A * 7/1928 Stephenson ...................... 285/44
4,086,736 A 5/1978 Landrigan
(Continued)

FOREIGN PATENT DOCUMENTS

| WO | 9704838 A1 | 2/1997 |
| WO | 2007068787 A1 | 6/2007 |
| WO | 2008140399 A1 | 11/2008 |

OTHER PUBLICATIONS

Specified Technologies, Inc., "SpecSeal Firestop Products, Ready™ SPILT Sleeve Kit, The Affordable Solution for Firestopping Existing Cables", 2006, 2 pages.

*Primary Examiner* — Ryan Reis
(74) *Attorney, Agent, or Firm* — Christopher S. Clancy; James H. William

(57) ABSTRACT

A fire stop system with a pass through device is installed in a structural opening. The fire stop system includes a split pipe, a foam wall gasket and an annulus plate. The split pipe includes a first end and a second end. The first end and the second end have an intumescent material installed thereon to seal the split pipe when the split pipe is exposed to elevated temperatures. The foam wall gasket is installed around the split pipe adjacent the structural opening. The foam wall gasket forms a contour to the structural opening blocking air flow between the split pipe and the opening. The annulus plate covers the foam wall gasket and is installed around the split pipe at the structural opening.

36 Claims, 22 Drawing Sheets

(51) Int. Cl.
*F16L 5/04* (2006.01)
*H02G 3/04* (2006.01)

(56) References Cited

U.S. PATENT DOCUMENTS

| | | | |
|---|---|---|---|
| 4,364,210 A | 12/1982 | Fleming et al. | |
| 4,431,198 A | 2/1984 | Beinhaur et al. | |
| 4,666,164 A | 5/1987 | Becker et al. | |
| 4,894,966 A * | 1/1990 | Bailey et al. | 52/317 |
| 5,058,341 A | 10/1991 | Harbeke, Jr. | |
| 5,103,609 A | 4/1992 | Thoreson et al. | |
| 5,155,957 A | 10/1992 | Robertson et al. | |
| 5,393,930 A * | 2/1995 | Wuertz | 174/483 |
| 5,947,159 A | 9/1999 | Takahashi | |
| 5,953,872 A | 9/1999 | MacMillian et al. | |
| 5,970,670 A | 10/1999 | Hoffman | |
| 5,996,643 A | 12/1999 | Stonitsch | |
| 6,029,412 A | 2/2000 | Gohlke | |
| 6,180,882 B1 | 1/2001 | Dinh | |
| 6,360,502 B1 | 3/2002 | Stahl, Jr. | |
| 6,464,229 B1 | 10/2002 | Kogler et al. | |
| 6,477,813 B2 | 11/2002 | Andresen | |
| 6,536,169 B2 | 3/2003 | Dykhoff | |
| 6,550,819 B2 | 4/2003 | DeSanto, Sr. | |
| 6,572,948 B1 | 6/2003 | Dykhoff | |
| 6,694,684 B2 | 2/2004 | Radke et al. | |
| 6,732,481 B2 | 5/2004 | Stahl, Sr. | |
| 6,820,382 B1 | 11/2004 | Chambers et al. | |
| 6,862,852 B1 | 3/2005 | Beele | |
| 6,928,777 B2 | 8/2005 | Cordts | |
| 7,080,486 B2 | 7/2006 | Radke et al. | |
| 7,082,730 B2 | 8/2006 | Monden et al. | |
| 7,114,303 B2 | 10/2006 | Cordts et al. | |
| 7,193,153 B2 | 3/2007 | Hemingway et al. | |
| 7,197,514 B2 | 3/2007 | Boros et al. | |
| 7,373,761 B2 | 5/2008 | Stahl, Sr. | |
| 7,373,945 B2 | 5/2008 | Foerg et al. | |
| 7,465,888 B2 | 12/2008 | Fischer et al. | |
| 7,523,590 B2 | 4/2009 | Stahl, Sr. | |
| 7,550,672 B2 * | 6/2009 | Chadbourne et al. | 174/92 |
| 7,596,914 B2 | 10/2009 | Stahl, Sr. et al. | |
| 7,642,461 B2 | 1/2010 | Klein et al. | |
| 7,665,256 B2 | 2/2010 | Miller et al. | |
| 7,685,792 B2 | 3/2010 | Stahl, Sr. et al. | |
| 7,712,791 B1 | 5/2010 | Whitehead | |
| 8,029,345 B2 * | 10/2011 | Messmer et al. | 454/284 |
| 8,397,452 B2 * | 3/2013 | Stahl et al. | 52/232 |
| 2004/0016193 A1 | 1/2004 | Stahl, Sr. | |
| 2004/0093814 A1 | 5/2004 | Cordts et al. | |
| 2006/0000630 A1 | 1/2006 | Hemingway | |
| 2006/0053710 A1 | 3/2006 | Miller et al. | |
| 2006/0060369 A1 | 3/2006 | Hemingway et al. | |
| 2006/0138251 A1 | 6/2006 | Stahl, Sr. | |
| 2007/0099509 A1 | 5/2007 | Fischer et al. | |
| 2007/0125018 A1 | 6/2007 | Stahl, Sr. | |
| 2008/0128998 A1 | 6/2008 | Klein et al. | |

* cited by examiner

US 9,220,932 B2

FIRE STOP SYSTEM

CROSS-REFERENCE TO RELATED APPLICATION

This application is a continuation of U.S. patent application Ser. No. 13/178,254, filed on Jul. 7, 2011, which claims the benefit of U.S. Provisional Patent Application No. 61/363,811, filed on Jul. 13, 2010.

The subject matter of each of the patent applications listed above is incorporated by reference in its entirety.

FIELD OF THE INVENTION

The present invention relates to a fire stopping pass through device, and more particularly to an improved fire stop system with a pass through device that includes an annulus plate and a split pipe.

BACKGROUND OF THE INVENTION

Fire stop systems designed to seal openings to prevent the spread of fires are well known. A fire stop system generally helps prevent the spread of smoke or flames throughout a facility, thereby limiting damage to the facility and providing building occupants more time to safely evacuate the facility.

U.S. Pat. No. 4,086,736, for example, discloses a fire and liquid seal used in a structural wall. The fire seal includes a support pipe that extends through a wall. The support pipe is filled with a body of insulation materials consisting of ceramic fibers or silicone foam. A shield or boot consisting of an aluminized conical fiberglass member is secured to each end of the support pipe. As a result, there is a shield or boot located on each side of the wall. When a high temperature flame and combustion is present on one side of the wall, the shield or boot on the exposed side is typically destroyed. However, the shield or boot on the opposite side of the wall is protected from the high temperature. The unexposed shield or boot provides a gas and liquid seal to prevent the spread of the flame and combustion through the wall opening.

The fire stop systems of the prior art, although capable of preventing the spread of fire, have several disadvantages therewith. As a result, it is desirable to provide an improved fire stop system that consistently meets the code requirements for an F-rated, a T-rated and an L-rated system.

SUMMARY OF THE INVENTION

The present invention is directed to a fire stop system with a pass through device installed in a structural opening. The fire stop system includes a split pipe, a foam wall gasket and an annulus plate. The split pipe includes an intumescent material installed on the split pipe at each end. The intumescent material seals the split pipe when the split pipe is exposed to elevated temperatures. The foam wall gasket is installed around the split pipe adjacent the structural opening. The foam wall gasket forms a contour to the structural opening blocking air flow between the split pipe and the opening. The annulus plate is installed around the split pipe at the structural opening. The annulus plate also covers the foam wall gasket.

DETAILED DESCRIPTION

Figure 1:
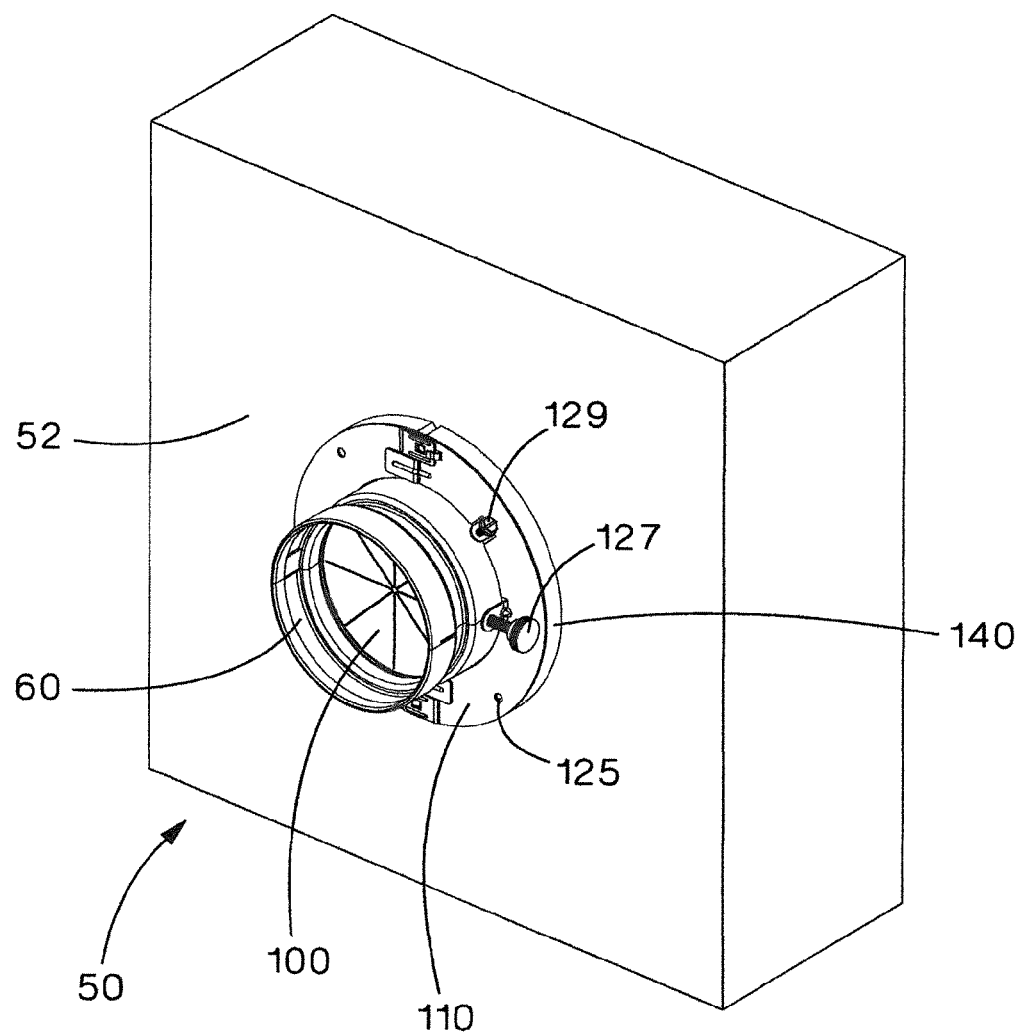
FIG. 1 is a perspective view of the fire stop system of the present invention.

The present invention is directed to a fire stop system 50 with a pass through device horizontally installed in a wall or vertically installed in a floor. FIG. 1 illustrates the fire stop system 50 with the pass through device installed in a wall 52. The fire stop system 50 is designed to provide an F-rated and a T-rated system. The F-rating is the time in hours before a fire rated system allows the passage of flame through an opening in the system assembly. The T-rating is the time in hours that the non-fire side of a fire rated system does not exceed 325° F. above ambient temperature.

Figure 2:
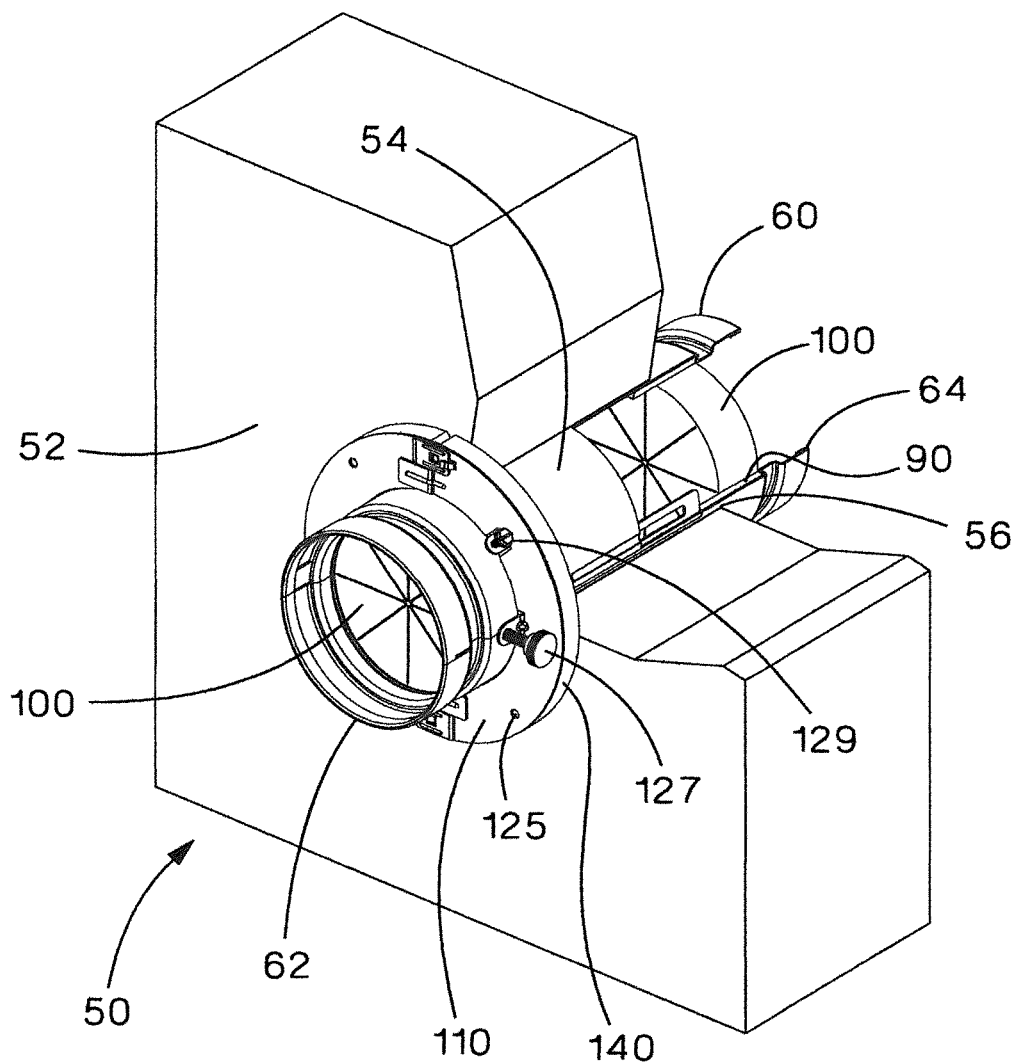
FIG. 2 is a sectional view of the fire stop system of FIG. 1 with a portion of the wall, an annulus plate and a foam wall gasket removed.

FIG. 2 illustrates a sectional view of the fire stop system 50 with the pass through device. As discussed below, the illustrated pass through device includes a split pipe 60 with a first end 62 and a second end 64. An intumescent material 90 and pie foam disks 100 are installed at both the first and second ends 62, 64 of the split pipe 60. As illustrated in FIG. 2, the pie foam disks 100 are installed on top of the intumescent material 90. The intumescent material 90 expands and seals off the split pipe 60 when it is exposed to elevated temperatures. The pie foam disks 100 aid in the compression of the intumescent material 90 and are beneficial to passing the hose stream test under UL-1479.

An annulus plate 110 and a foam wall gasket 140 are installed around the split pipe 60 at the opening 56 of the hole 54 on each side of the wall 52 or floor (not illustrated).

Figure 3:
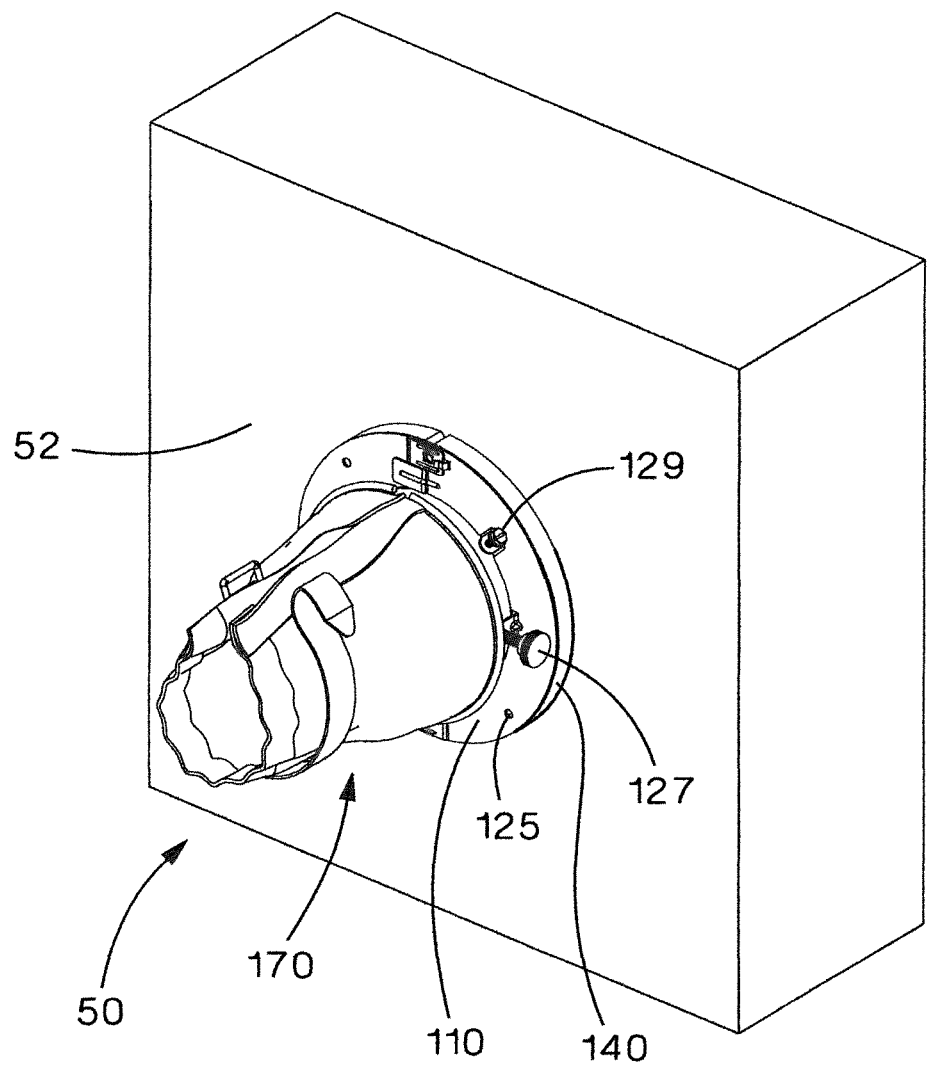
FIG. 3 is a perspective view of the fire stop system of FIG. 1 with a hot sock installed around the split pipe in place of the pie foam disk.

FIG. 3 illustrates an alternative design for the fire stop system 50. The alternative design includes a hot sock 170 installed around the split pipe 60. The hot sock 170 replaces the pie foam disks 100 in the fire stop system 50 when the user requires an L-rated system. The L-rating is the amount of air leakage through a pass through device.

Figure 4:
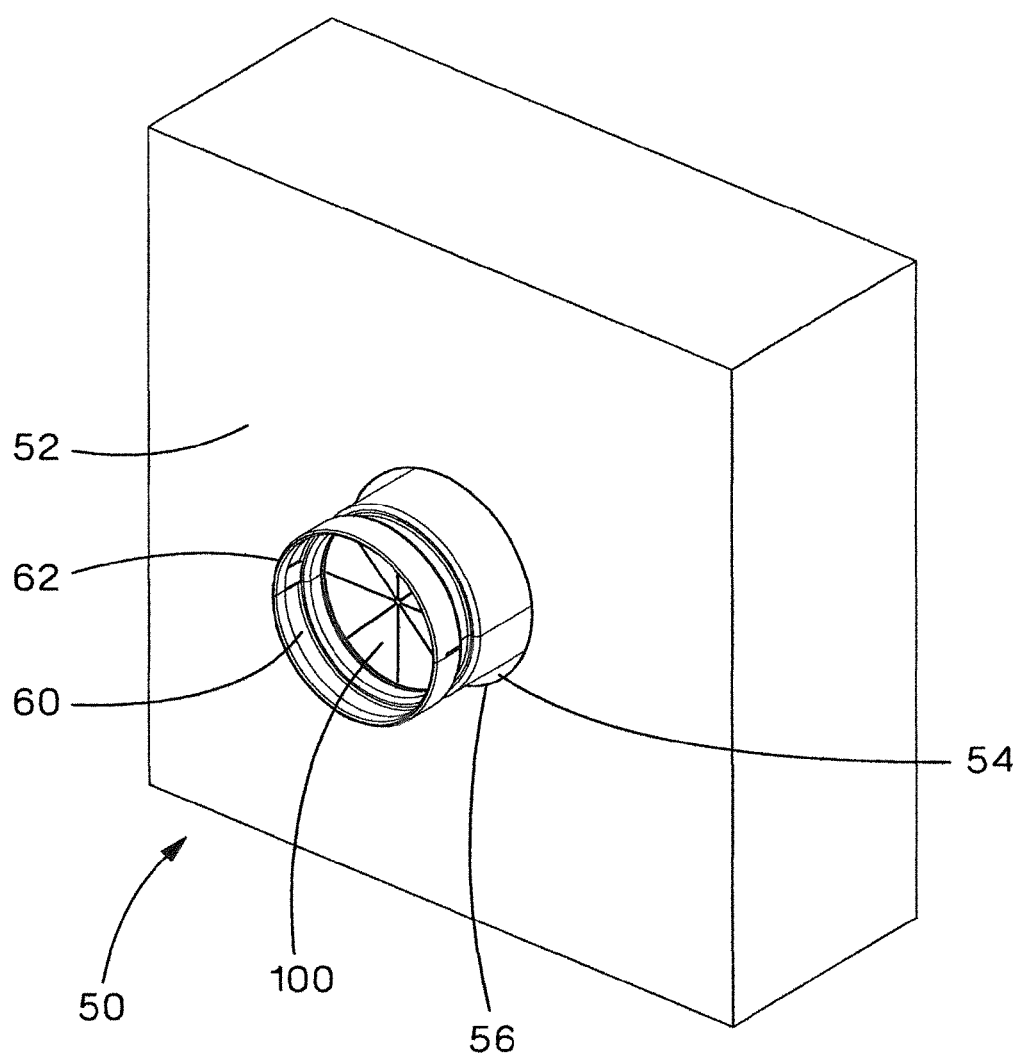
FIG. 4 is a perspective view of the fire stop system of FIG. 1 with the annulus plate and foam wall gasket removed.
Figure 5:
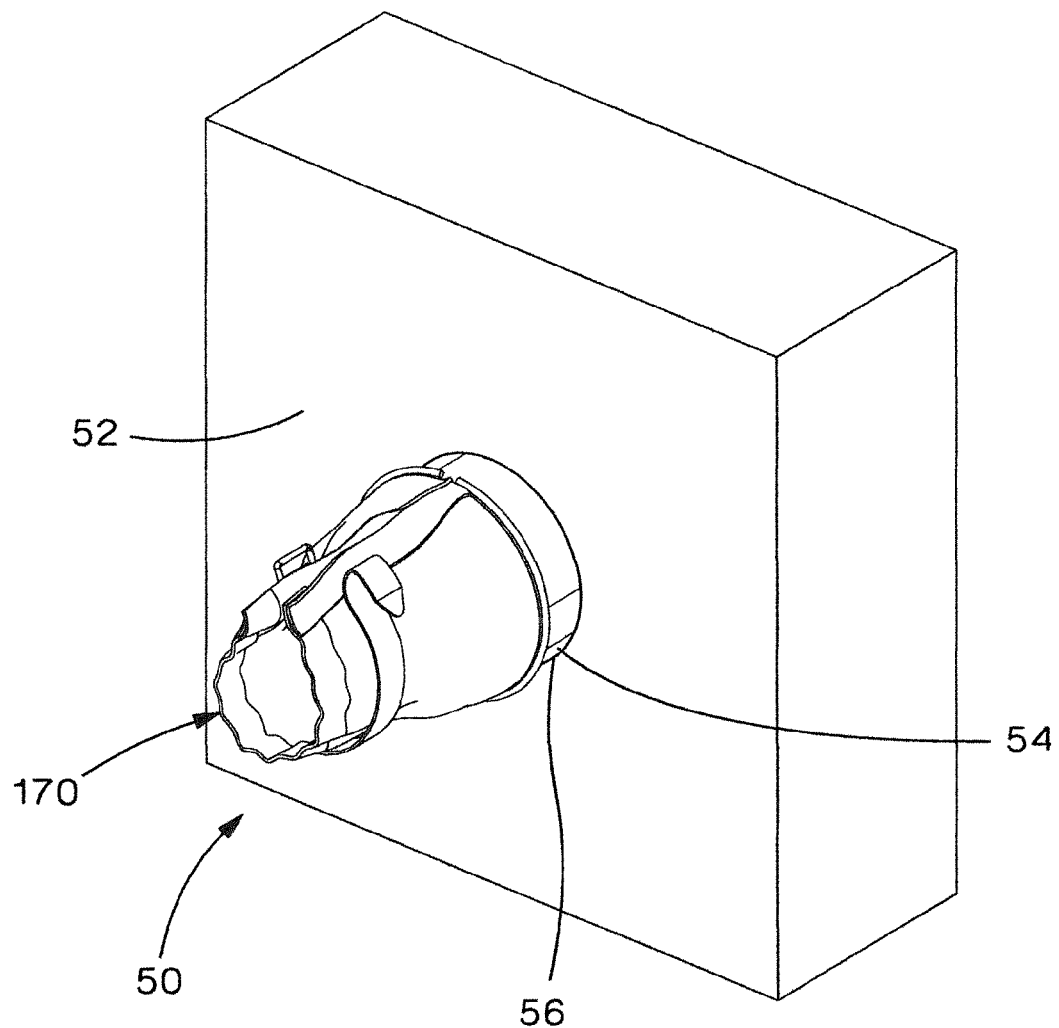
FIG. 5 is a perspective view of the fire stop system of FIG. 4 with a hot sock installed around the split pipe in place of the pie foam disk.

FIGS. 4 and 5 illustrate alternative designs of the fire stop system 50 without the annulus plate 110 and the foam wall gasket 140. Instead, an intumescent caulk (not illustrated) would be used to fill the annular space between the split pipe 60 and the bored or drilled hole 54 in the wall 52 or the floor.

As illustrated and discussed with respect to FIGS. 1-5, the fire stop system 50 of the present invention may include various components depending on the rating desired. FIGS. 6-20 illustrate the various components of the fire stop system 50.

FIGS. 6-9 illustrate the split pipe 60 of the pass through device. The split pipe 60 includes two identical halves 60a, 60b formed from a universal sheet metal. The elements of the identical halves 60a, 60b are referenced by the same numeral. An intumescent material 90 is pre-installed near the first end 62 and the second end 64 of the split pipe 60.

Figure 6:
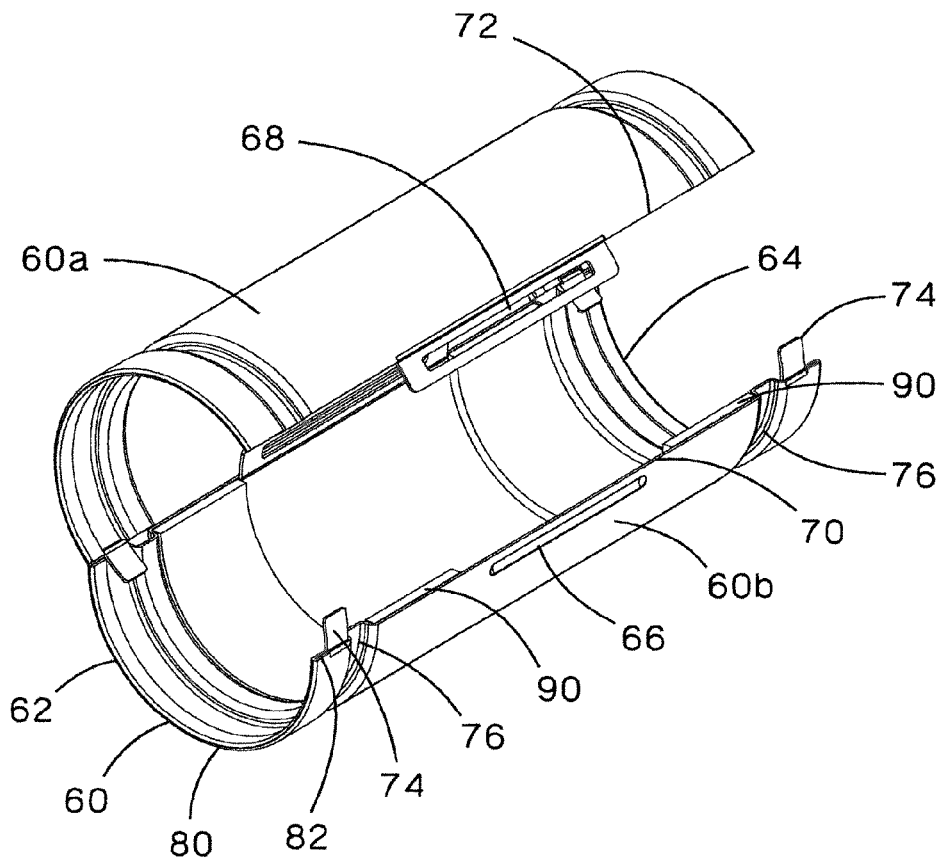
FIG. 6 is a perspective view of the split pipe of FIG. 2 in a partially open position.
Figure 7:
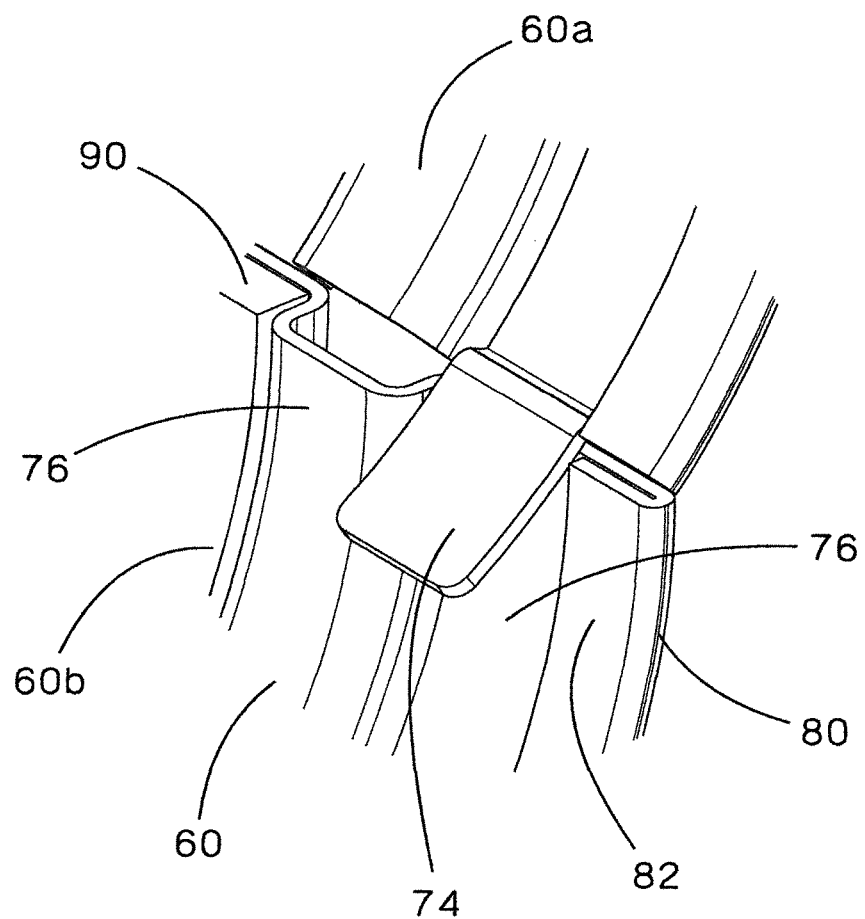
FIG. 7 is a perspective view of the alignment tabs of the split pipe of FIG. 6.
Figure 8:
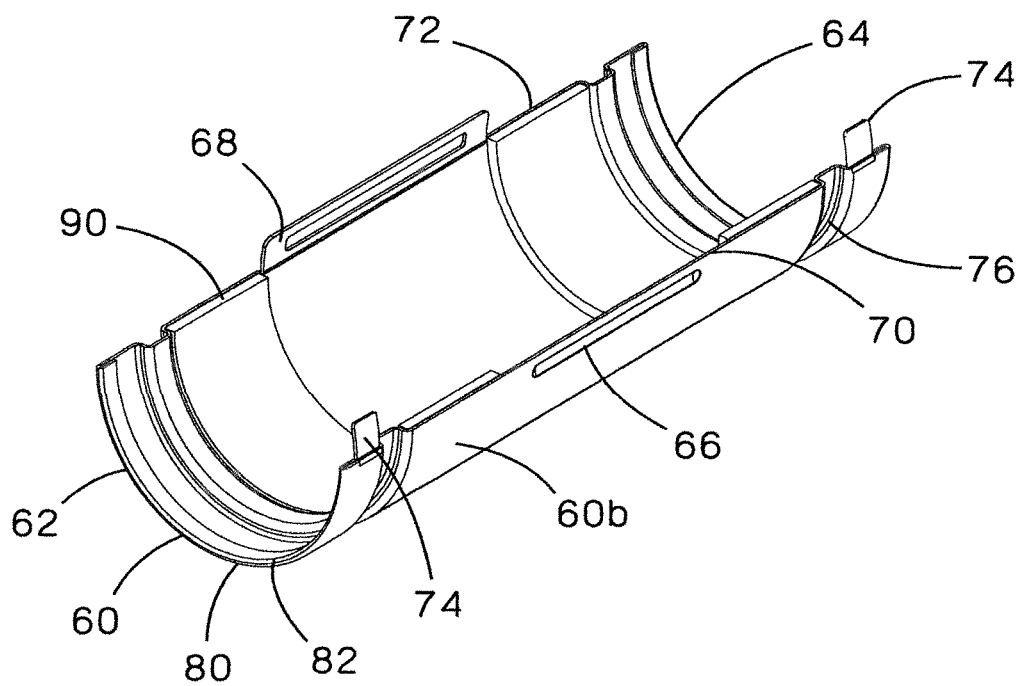
FIG. 8 is a perspective view of one half of the split pipe of FIG. 6.
Figure 9:
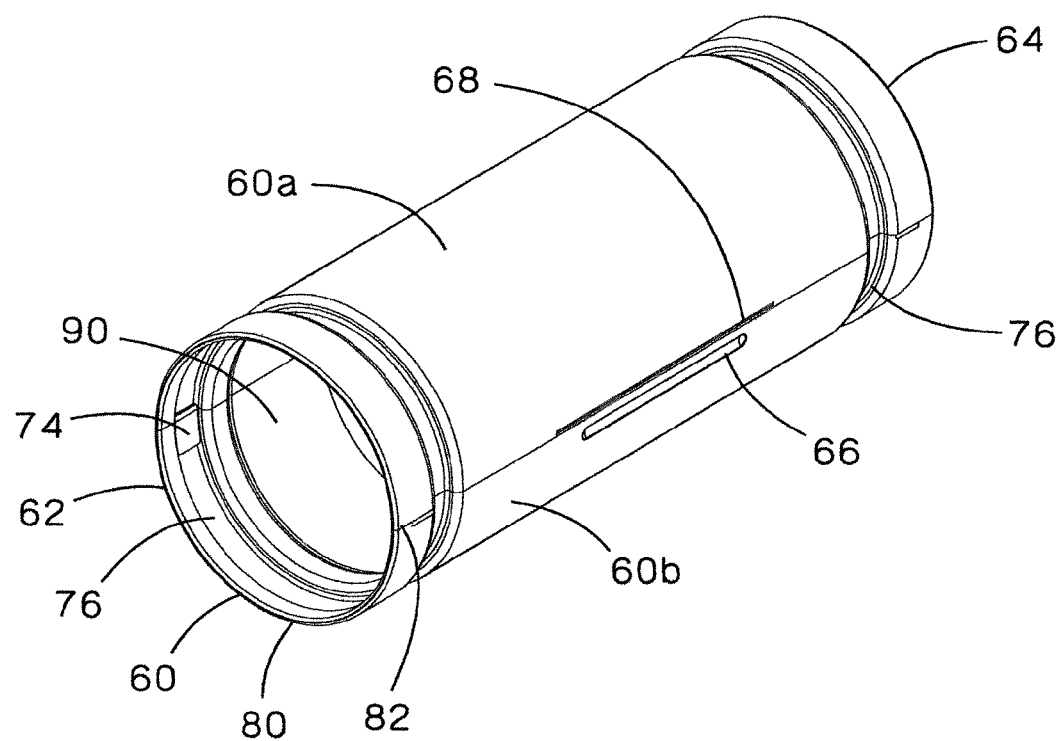
FIG. 9 is a perspective view of the split pipe of FIG. 6 in a closed position.
Figure 10:
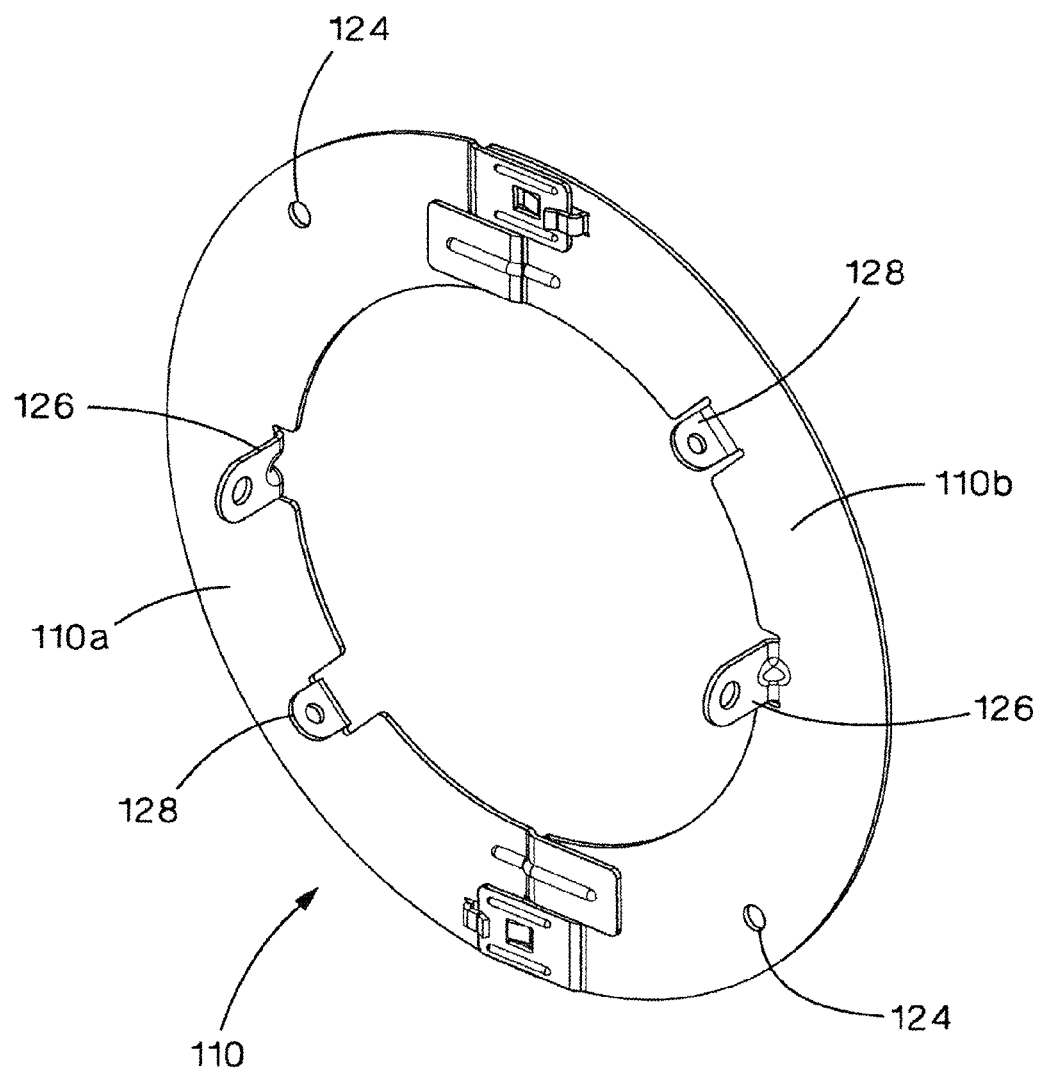
FIG. 10 is a perspective view of the annulus plate of FIG. 1.
Figure 11:
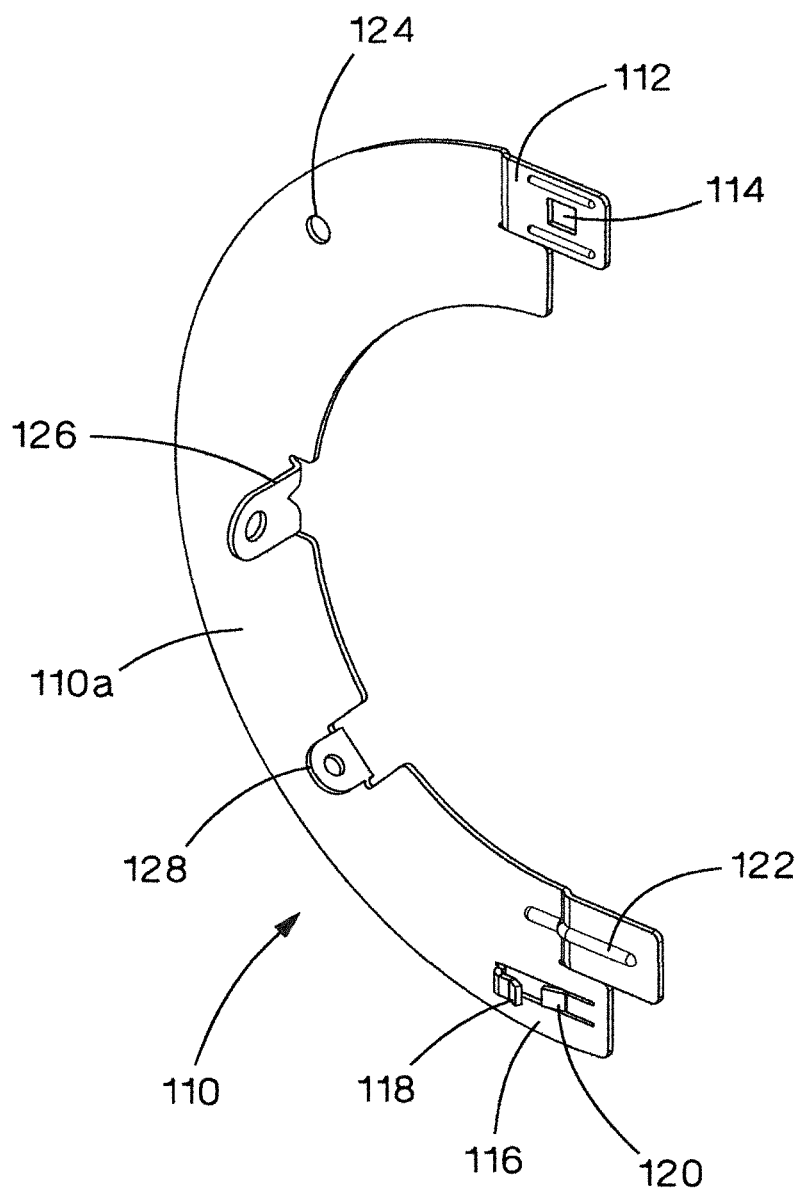
FIG. 11 is a perspective view of one half of the annulus plate of FIG. 10.
Figure 12:
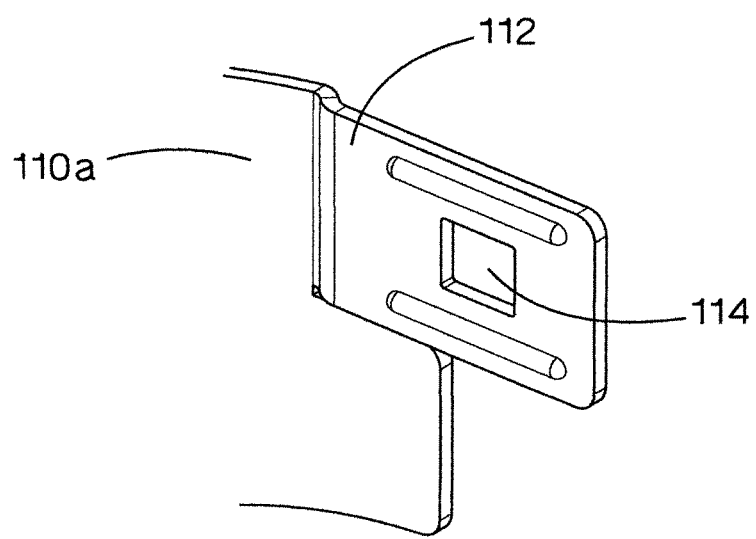
FIG. 12 is a perspective view of a first latch with a catch pocket of the annulus plate of FIG. 11.

Each half of the split pipe 60a, 60b includes a bead latch 66 and a receiver pocket 68 positioned at the center of the split pipe 60. As illustrated in FIG. 6 and FIG. 8, the bead latch 66 is positioned along one side 70 and the receiver pocket 68 is positioned along the opposite side 72 of each split pipe half 60a, 60b. The bead latch 66 of one half snap fits into the receiver pocket 68 of the other half of the split pipe 60. The snap fit bead latch 66 and receiver pocket 68 allow the split pipe 60 to be opened, if needed.

The snap fit latch 66 and receiver pocket 68 allow the split pipe 60 to be secured and installed during new construction. The snap fit latch 66 and receiver pocket 68 also allows the split pipe 60 to be used in retrofit construction applications.

Each end 62, 64 of the split pipe 60 includes an alignment tab 74 and formed pockets 76. The alignment tabs 74 act as a hinge while closing and opening the split pipe 60. Once the split pipe 60 has been closed, the alignment tabs 74 sit inside a formed pocket 76 to restrict the lateral movement of the split pipe 60. The formed pockets 76 provide a smooth edge for cable pulls and protect the pre-installed intumescent material 90. The edge 80 of the split pipe 60 includes a rolled hem 82 for providing a smooth edge for cable pulls.

The formed pockets 76 are also designed to receive a spring ring 160 that secures the hot sock 170 to the split pipe 60. As discussed below with respect to FIGS. 19-20, the spring ring 160 secured to the hot sock 170 snaps into a formed pocket 76 of the split pipe 60 to prevent the hot sock 170 from being pulled off the split pipe 60.

FIGS. 10-14 illustrate the retrofit annulus plate 110 to be used in applications where cables are already routed through the wall 52. The retrofit annulus plate 110 includes two identical halves 110a, 110b formed from a universal sheet metal. The elements of the identical halves 110a, 110b are referenced by the same numeral.

Each half of the annulus plate 110a, 110b is a semicircular half with a catch pocket 112 at one end and a locking mechanism 116 at the opposite end. The catch pocket 112 includes an opening 114 for engaging the locking mechanism 116 (see FIG. 12).

Figure 13:
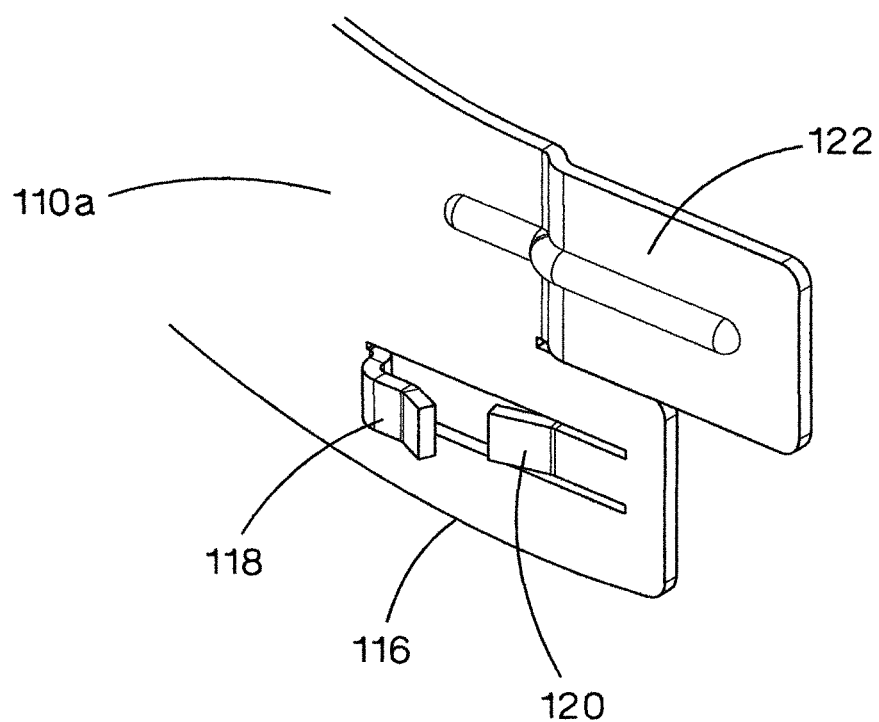
FIG. 13 is a perspective view of a second latch with a stabilizer tab, a retaining tab and a locking tab of the annulus plate of FIG. 11.
Figure 14:
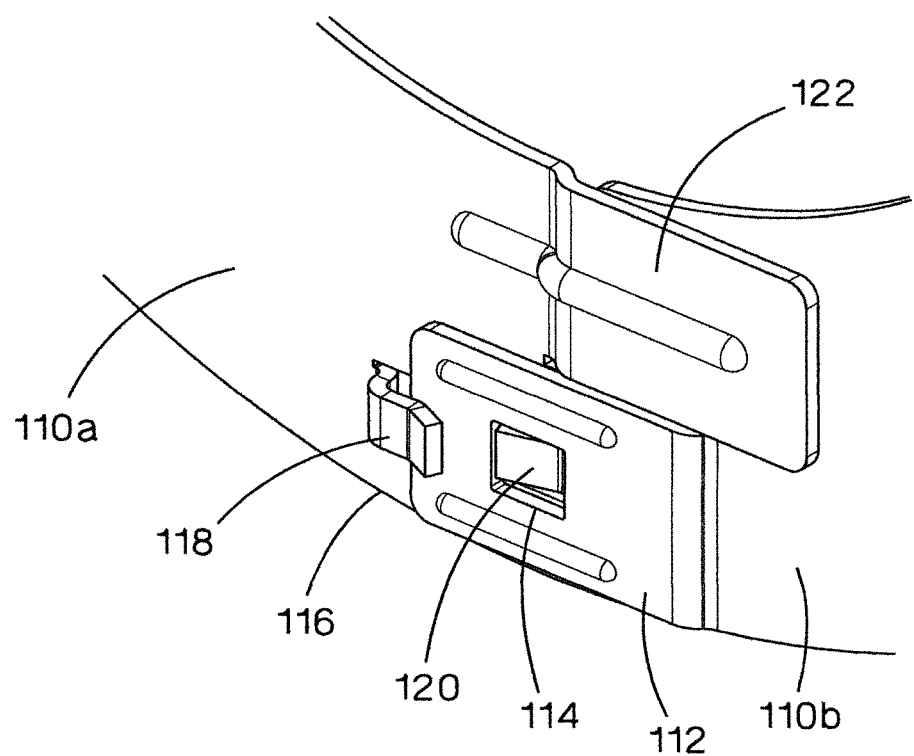
FIG. 14 is a perspective view of the latches of the annulus plate of FIG. 10 locked together.

The locking mechanism 116 includes a retaining tab 118, a locking tab 120 and a stabilizing tab 122 (see FIG. 13). The retaining tab 118 and the locking tab 120 flex out of position until the catch pocket 112 snaps into a locking engagement with the locking tab 120. As a result, the catch pocket 112 is retained by the retaining tab 118 (see FIG. 14).

The retrofit annulus plate 110 also includes punched screw holes 124 for receiving a screw 125, or other fastener, to secure the annulus plate 110 to the wall 52, thumb screw tabs 126 and ground screw tabs 128 (see FIGS. 1-3). The thumb screw tabs 126 receive a thumb screw 127, or other fastener, to secure the annulus plate 110 to the split pipe 60 thereby preventing lateral movement of the split pipe 60 from within the hole 54 in the wall 52. The ground screw tabs 128 enable the annulus plate 110 to receive a ground screw 129, or other fastener, to ground the fire stopping system 50.

Figure 15:
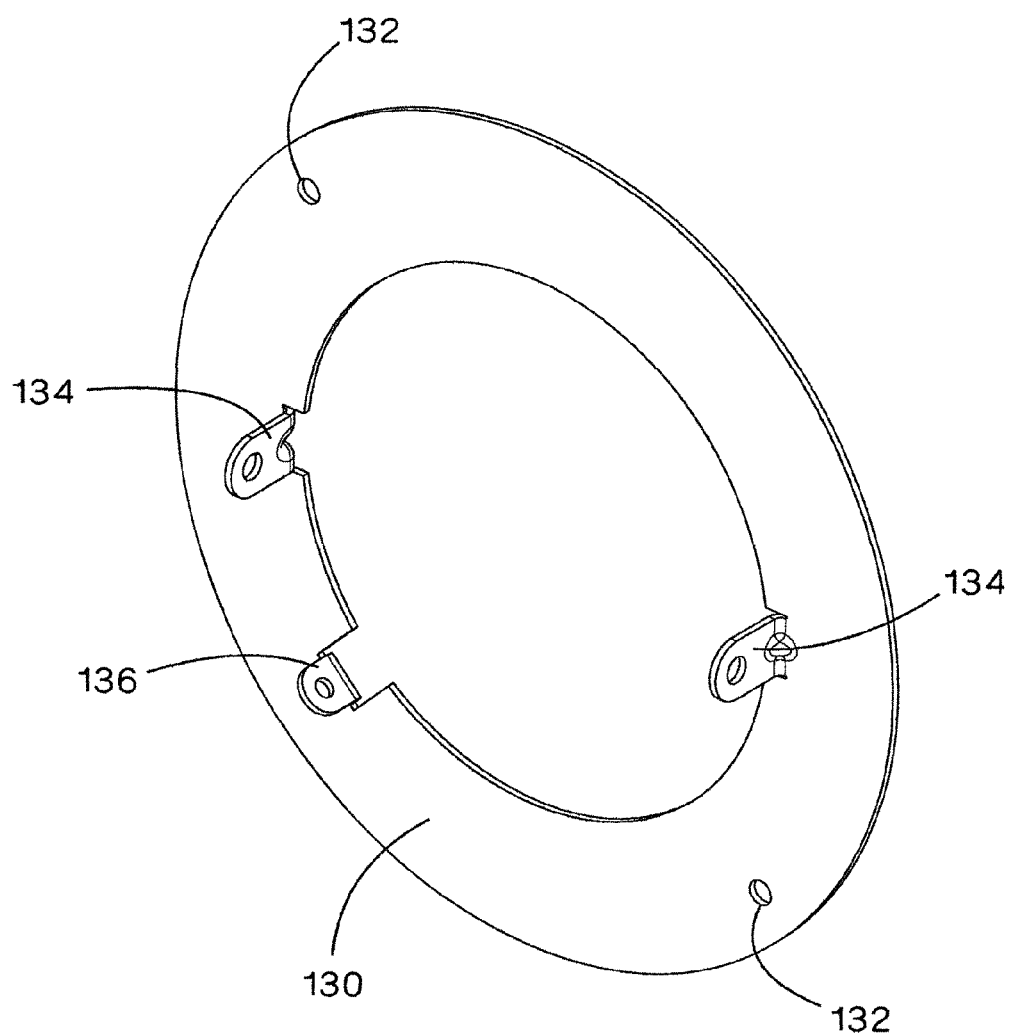
FIG. 15 is an alternative annulus plate for use with the fire stop system of the present invention.

FIG. 15 illustrates a non-retrofit annulus plate 130. The annulus plate 130 is a single circular piece that is used for non-retrofit applications, e.g. when cables have been passed through the wall 52. The annulus plate 130 also includes punched holes 132 for receiving a fastener to secure the plate 130 to the wall 52, thumb screw tabs 134 and at least one ground screw tab 136. The thumb screw tabs 134 receive a screw, or other fastener, to secure the annulus plate 130 to the split pipe 60 thereby preventing lateral movement of the split pipe 60 from within the hole 54 in the wall 52. The ground screw tab 136 enables the annulus plate 130 to receive a screw, or other fastener, to ground the fire stop system 50.

Figure 16:
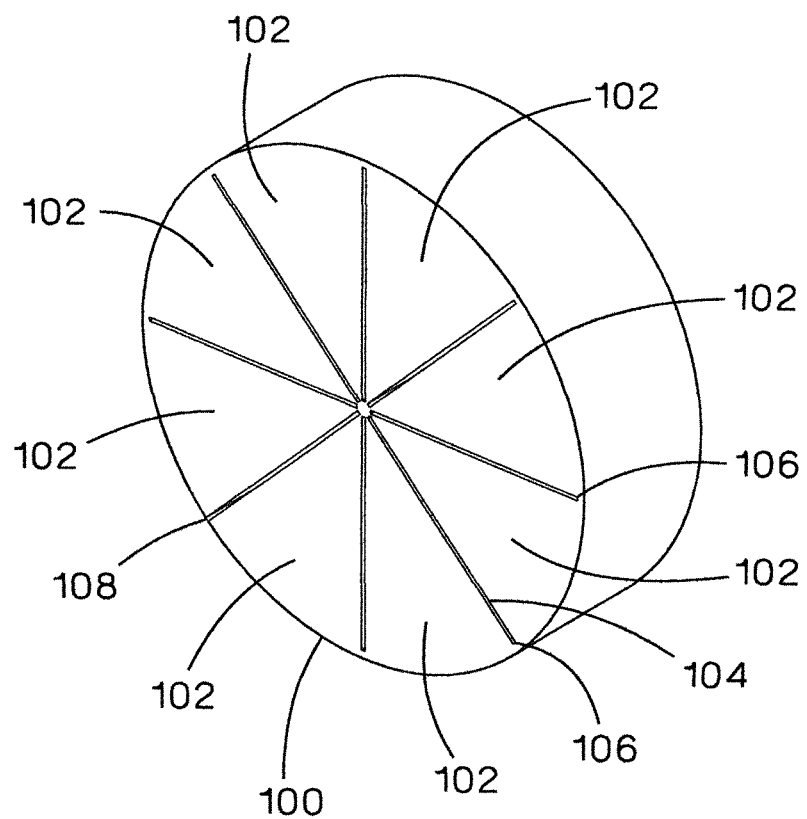
FIG. 16 is a perspective view of the pie foam disk of the fire stop system of FIG. 1.

FIG. 16 illustrates the pie foam disk 100. The pie foam disk 100 is a foam plug that may be positioned at the first end 62 and the second end 64 of the split pipe 60 (see FIG. 2). Each pie foam disk 100 includes triangle shaped sections 102 formed by slits 104 or nicks in the foam. The slits 104 or nicks form hinges 106 near the edge of the pie foam disk 100. One triangle shape section 102 includes a through slit 108 that allows the pie foam disk 100 to open up along the other formed hinges 106.

When the pie foam disk 100 is opened up, the pie foam disk 100 is capable of wrapping around various cable bundles. The foam compresses and contours around the cable bundles and jackets to provide a seal. The pie foam disk 100 may be used from a zero cable loading condition all the way up to and including a 100% cable loading condition.

The pie foam disk 100 also aids in the compression of the intumescent material 90 in the split pipe 60 during elevated temperature conditions (see FIG. 2). This compression is beneficial in passing the hose stream test described in UL-1479.

Figure 17:
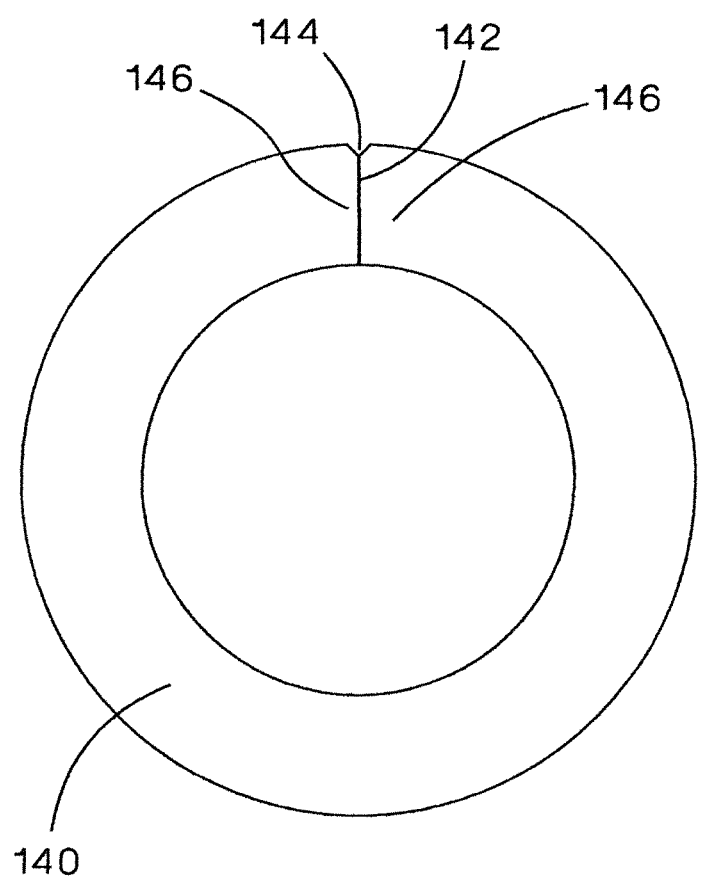
FIG. 17 is a front view of the foam wall gasket of the fire stop system of FIG. 1.
Figure 18:
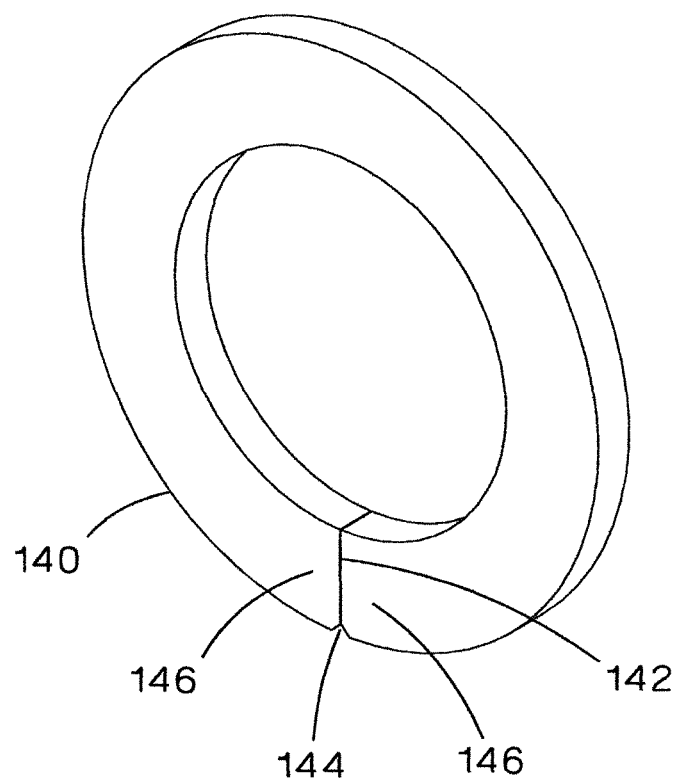
FIG. 18 is a bottom perspective view of the foam wall gasket of FIG. 17.

FIGS. 17-18 illustrate the foam wall gasket 140. The foam wall gasket 140 is placed behind the annulus plate 110 or 130 adjacent to the wall 52 or floor. The foam wall gasket 140 will form a contour to the wall surface blocking air flow between the split pipe 60 and the hole 54.

The foam wall gasket 140 includes a nicked slit 142 to enable an installer to tear or rip the foam wall gasket 140 for installation in a retrofit application. As illustrated in FIG. 17, a "V" cut 144 identifies the nicked slit area. To install in a retrofit application, the foam wall gasket 140 is torn at the nicked slit 142 and installed around the split pipe 60. After the foam wall gasket is installed, the ends 146 are overlapped and compressed between the wall 52 and the annulus plate 110 or 130. The inner diameter of the foam wall gasket 140 conforms to the outer diameter of the split pipe 60 (see FIGS. 1 and 2). As a result, the overlapping ends 146 of the foam wall gasket 140 will create an interference with the outer diameter of the split pipe 60.

Alternatively, for non-retrofit applications, a solid foam wall gasket (not illustrated) may be used.

Figure 19:
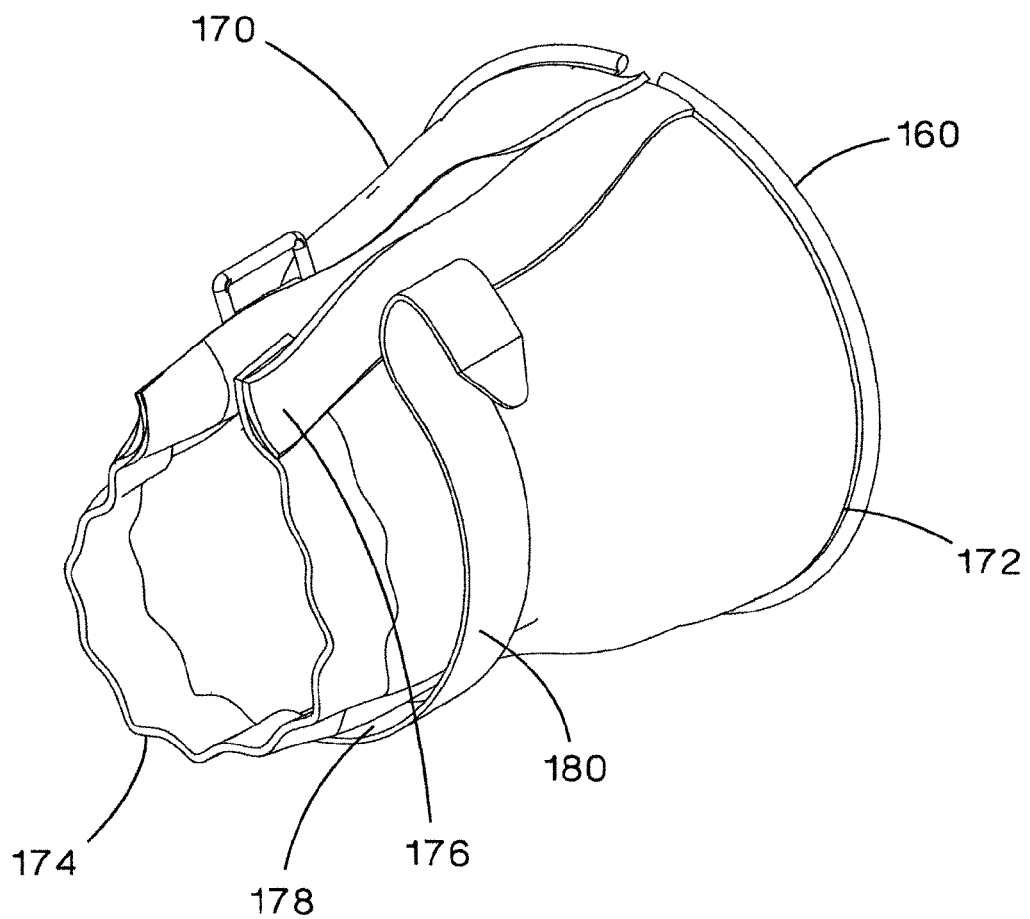
FIG. 19 is a perspective view of the hot sock assembly of FIG. 3.
Figure 20:
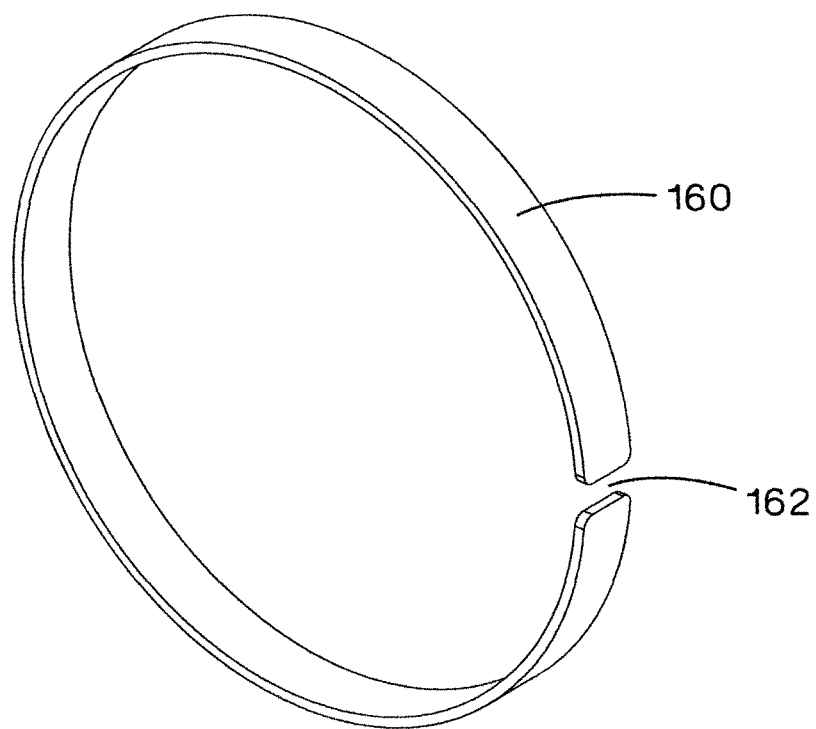
FIG. 20 is a perspective view of the spring ring of the hot sock assembly of FIG. 19.

FIGS. 19-20 illustrate the hot sock 170 and spring ring 160 used in the fire stop system 50 illustrated in FIGS. 3 and 5. The hot sock 170 and spring ring 160 assembly may be used for retrofit or non-retrofit applications.

The hot sock 170 is formed from a nylon rip stop material that blocks the flow of air through the hot sock 170 once it is installed and sealed. The hot sock 170 includes a base 172 and a top 174. A spring ring 160 is sewn into the base 172 of the hot sock 170. The spring ring 160 includes an opening 162 for retrofit applications. To install the hot sock 170 and attached spring ring 160, spring ring 160 flexes to open up the hot sock 170 and snaps into one of the formed pockets 76 along the outside of the ends 62, 64 of the split pipe 60.

The hot sock 170 also includes a hook and loop material 176 sewn into place along the horizontal length of the hot sock 170 enabling the hot sock 170 to be used for retrofit applications. Once the hot sock 170 is installed and sealed, the hook and loop material 176 seals the hot sock 170 around the cable bundle blocking the air flow.

A strip of foam 178 and a strap of hook and loop material 180 are sewn into the hot sock 170 near the top 174 of the hot sock 170. The strap of hook and loop material 180 is used to cinch the hot sock 170 tightly around the cable bundle once installed. The strip of foam 178 located under the strap 180 conforms to the cable bundles blocking the air flow through the hot sock 170.

Figure 21:
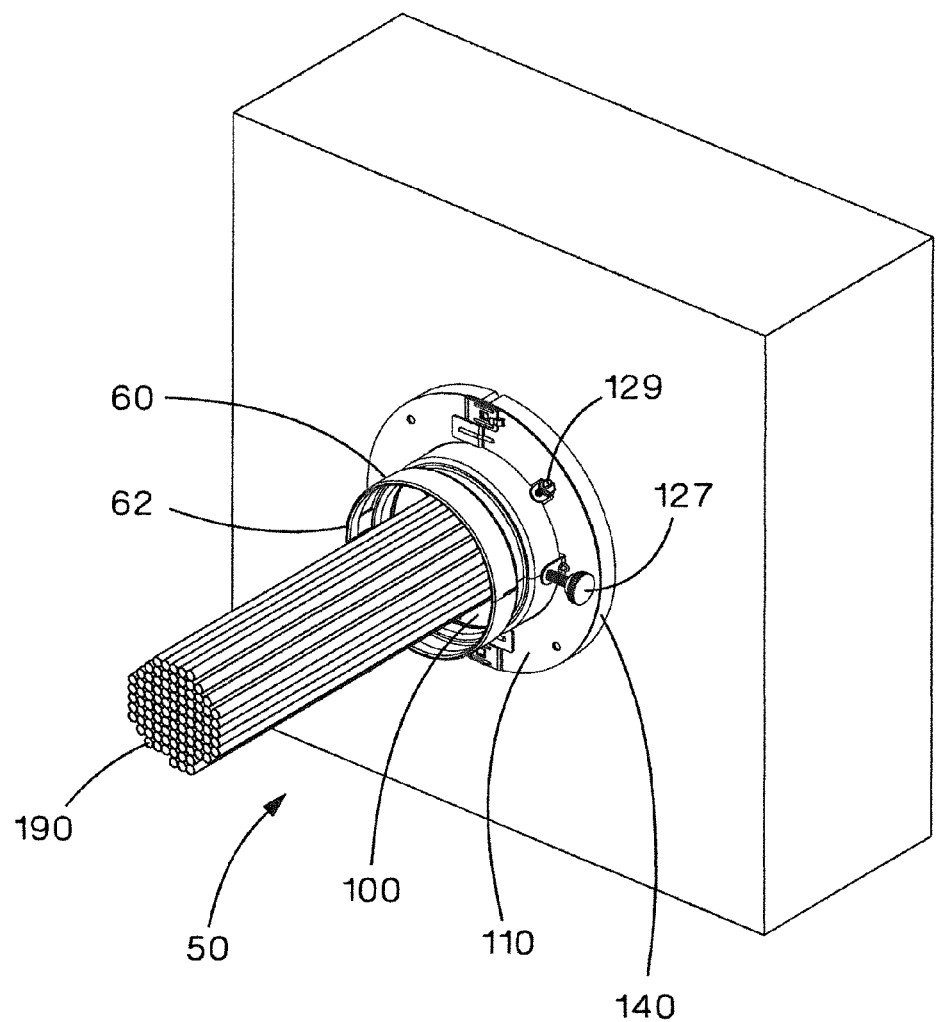
FIG. 21 is a perspective view of the fire stop system of FIG. 1 with cables installed through the system.
Figure 22:
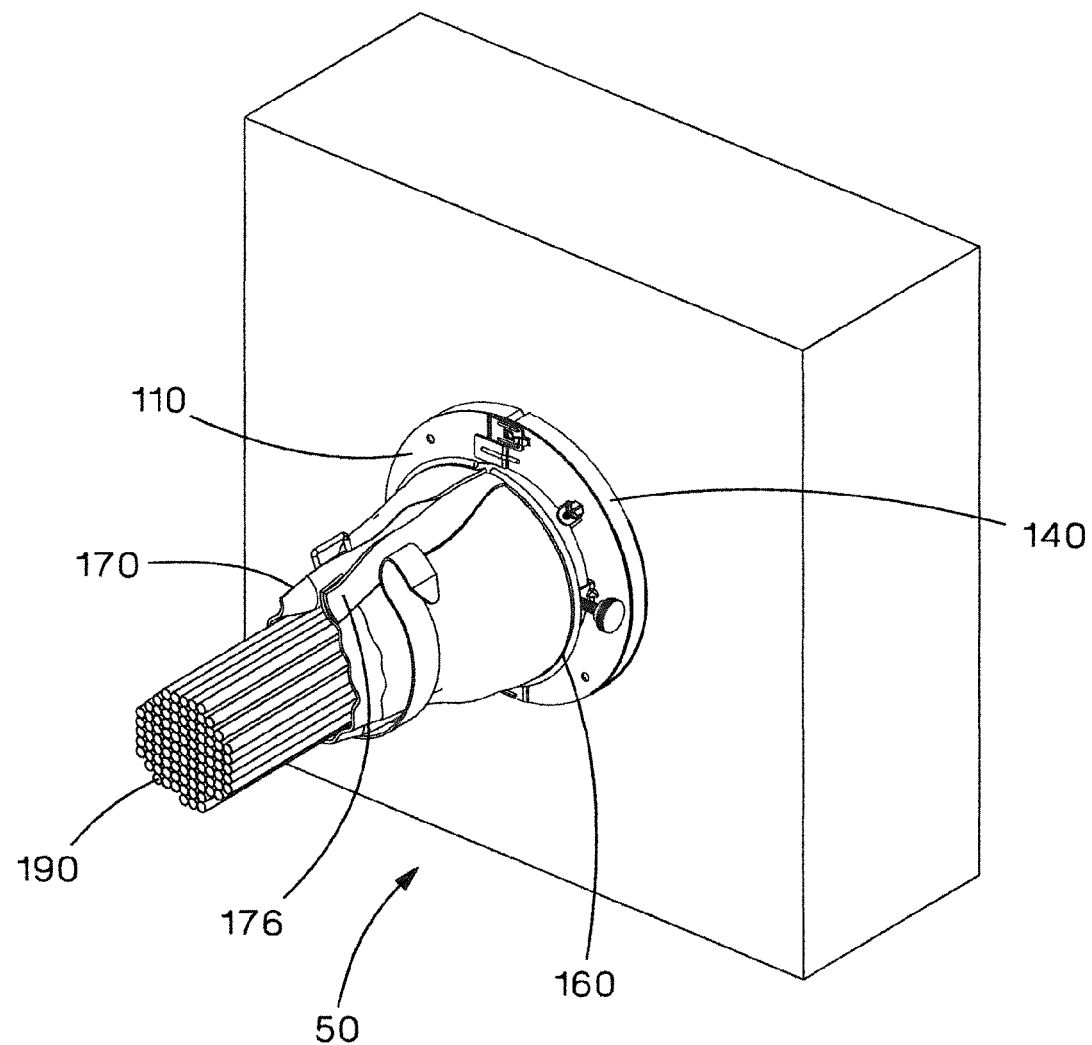
FIG. 22 is a perspective view of the fire stop system of FIG. 3 with cables installed through the system.

FIGS. 21 and 22 illustrate the fire stop system 50 with the pass through device installed around a bundle of cables 190. The fire stop system 50 illustrated in FIG. 21 is an F-rated and a T-rated system. The foam wall gasket 140 provides a seal behind the annulus plate 110 conforming to the concrete or gypsum wall 52 thereby sealing the annular space 54 between the split pipe 60 and the wall opening 56. The pie foam disk 100 contours to create a seal around the cable bundle 190. The pie foam disk 100 also aids in the compression of the intumescent material 90 in an elevated temperature condition.

The fire stop system 50 illustrated in FIG. 22 is an F-rated, a T-rated and an L-rated system. The hot sock 170 is easily installed around the split pipe 60 by snapping the spring ring 160 into the formed pockets 76 in the split pipe 60. The hook and loop material 176 along the length of the hot sock 170 is fastened. A strip of foam 178 located inside the hot sock 170 will contour to the cables 190 thereby restricting airflow.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A fire stop system with a pass through device installed in a structural opening, the fire stop system comprising:
    a split pipe having a first end and a second end, wherein the first end and the second end have an intumescent material installed thereon for sealing the split pipe when exposed to elevated temperatures;
    a foam wall gasket installed around the split pipe adjacent the structural opening, wherein the foam wall gasket forms a contour to the structural opening blocking air flow between the split pipe and the opening;
    an annulus plate covering the foam wall gasket, wherein the annulus plate is positioned around the split pipe at the structural opening;
    a hot sock install around the split pipe, wherein the hot sock has a base and a top; and
    a spring ring secured to the base of the hot sock, wherein the spring secures the hot sock to the split pipe,
    wherein the first end and the second end of the split pipe have a pocket, wherein the pocket receives the spring ring to secure the hot sock to the split pipe.

2. The fire stop system of claim 1, wherein the split pipe has two identical halves, each half having a latch along one side and a pocket along an opposite side, wherein the latch of one half of the split pipe snap fits into the pocket of the other half of the split pipe.

3. The fire stop system of claim 1, Wherein the first end and the second end of the split pipe have an edge with a rolled hem for providing a smooth transition for cables pulled through the split pipe.

4. The fire stop system of claim 1, wherein the first end and the second end of the split pipe have an alignment tab and a pocket, wherein the alignment tab is positioned in the pocket when the split pipe is closed to restrict lateral movement of the split pipe.

5. The fire stop system of claim 4, wherein the pocket has a smooth edge and the intumescent material is installed adjacent to the pocket, whereby the smooth edge of the pocket protects the intumescent material installed in the split pipe.

6. The fire stop system of claim 1, wherein the annulus plate has two identical semicircular halves, each half having a catch pocket at one end and a locking mechanism at an opposite end, wherein the catch pocket has an opening for engaging the locking mechanism.

7. The fire stop system of claim 6, wherein the locking mechanism has a plurality of tabs for engaging the catch pocket.

8. The fire stop system of claim 6, wherein the locking mechanism has a retaining tab, a locking tab and a stabilizing tab, wherein the retaining tab and the locking tab oppose each other and deflect into locking engagement with the catch pocket.

9. The fire stop system of claim 6, wherein each half of the annulus plate has a plurality of outwardly extending tabs for receiving a fastener to secure the annulus plate to the split pipe.

10. The fire stop system of claim 1, wherein the annulus plate is a single circular member, wherein the annulus plate has a plurality of outwardly extending tabs for receiving a fastener to secure the annulus plate to the split pipe.

11. The fire stop system of claim 1, wherein the hot sock has a foam strip, wherein the foam strip is positioned near the top of the hot sock, wherein the foam strip conforms to cables pulled through the hot sock, thereby blocking air flow between the hot sock and the cables.

12. A fire stop system with a pass through device installed in a structural opening, the fire stop system comprising:
    a split pipe having a first end and a second end, wherein the first end and the second end have an intumescent material installed thereon for sealing the split pipe when exposed to elevated temperatures;
    a foam wall gasket installed around the split pipe adjacent the structural opening, wherein the foam wall gasket forms a contour to the structural opening blocking air flow between the split pipe and the opening;
    an annulus plate covering the foam wall gasket, wherein the annulus plate is positioned around the split pipe at the structural opening;

a hot sock installed around the split pipe, wherein the hot sock has a base and a top; and
a spring ring secured to the base of the hot sock, wherein the spring ring secures the hot sock to the split pipe, wherein the hot sock has a foam strip, wherein the foam strip is positioned near the top of the hot sock, wherein the foam strip conforms to cables pulled through the hot sock, thereby blocking air flow between the hot sock and the cables.

13. The fire stop system of claim 12, wherein the split pipe has two identical halves, each half having a latch along one side and a pocket along an opposite side, wherein the latch of one half of the split pipe snap fits into the pocket of the other half of the split pipe.

14. The fire stop system of claim 12, wherein the first end and the second end of the split pipe have an edge with a rolled hem for providing a smooth transition for cables pulled through the split pipe.

15. The fire stop system of claim 12, wherein the first end and the second end of the split pipe have an alignment tab and a pocket, wherein the alignment tab is positioned in the pocket when the split pipe is closed to restrict lateral movement of the split pipe.

16. The fire stop system of claim 15, wherein the pocket has a smooth edge and the intumescent material is installed adjacent to the pocket, whereby the smooth edge of the pocket protects the intumescent material installed in the split pipe.

17. The fire stop system of claim 12, wherein the annulus plate has two identical semicircular halves, each half having a catch pocket at one end and a locking mechanism at an opposite end, wherein the catch pocket has an opening for engaging the locking mechanism.

18. The fire stop system of claim 17, wherein the locking mechanism has a plurality of tabs for engaging the catch pocket.

19. The fire stop system of claim 17, wherein the locking mechanism has a retaining tab, a locking tab and a stabilizing tab, wherein the retaining tab and the locking tab oppose each other and deflect into locking engagement with the catch pocket.

20. The fire stop system of claim 17, wherein each half of the annulus plate has a plurality of outwardly extending tabs for receiving a fastener to secure the annulus plate to the split pipe.

21. The fire stop system of claim 12, wherein the annulus plate is a single circular member, wherein the annulus plate has a plurality of outwardly extending tabs for receiving a fastener to secure the annulus plate to the split pipe.

22. A fire stop system with a pass through device installed in a structural opening, the fire stop system comprising:
a split pipe having a first end and a second end, wherein the first end and the second end have an intumescent material installed thereon for sealing the split pipe when exposed to elevated temperatures, wherein the first end and the second end of the split pipe have an alignment tab and a pocket, wherein the alignment tab is positioned in the pocket when the split pipe is closed to restrict lateral movement of the split pipe, wherein the pocket has a smooth edge and the intumescent material is installed adjacent to the pocket, whereby the smooth edge of the pocket protects the intumescent material installed in the split pipe;
a foam wall gasket installed around the split pipe adjacent the structural opening, wherein the foam wall gasket forms a contour to the structural opening blocking air flow between the split pipe and the opening; and
an annulus plate covering the foam wall gasket, wherein the annulus plate is positioned around the split pipe at the structural opening.

23. The fire stop system of claim 22, Wherein the split pipe has two identical halves, each half having a latch along one side and a pocket along an opposite side, wherein the latch of one half of the split pipe snap fits into the pocket of the other half of the split pipe.

24. The fire stop system of claim 22, wherein the first end and the second end of the split pipe have an edge with a rolled hem for providing a smooth transition for cables pulled through the split pipe.

25. The fire stop system of claim 22, wherein the annulus plate has two identical semicircular halves, each half having a catch pocket at one end and a locking mechanism at an opposite end, wherein the catch pocket has an opening for engaging the locking mechanism.

26. The fire stop system of claim 25, wherein the locking mechanism has a plurality of tabs for engaging the catch pocket.

27. The fire stop system of claim 25, wherein the locking mechanism has a retaining tab, a locking tab and a stabilizing tab, wherein the retaining tab and the locking tab oppose each other and deflect into locking engagement with the catch pocket.

28. The fire stop system of claim 25, wherein each half of the annulus plate has a plurality of outwardly extending tabs for receiving a fastener to secure the annulus plate to the split pipe.

29. The fire stop system of claim 22, wherein the annulus plate is a single circular member, wherein the annulus plate has a plurality of outwardly extending tabs for receiving a fastener to secure the annulus plate to the split pipe.

30. The fire stop system of claim 22, further comprising:
a hot sock installed around the split pipe, wherein the hot sock has a base and a top; and
a spring ring secured to the base of the hot sock, wherein the spring ring secures the hot sock to the split pipe.

31. A fire stop system with a pass through device installed in a structural opening, the fire stop system comprising:
a split pipe having a first end and a second end, wherein the first end and the second end have an intumescent material installed thereon for sealing the split pipe when exposed to elevated temperatures;
a foam wall gasket installed, around the split pipe adjacent the structural opening, wherein the foam wall gasket forms a contour to the structural opening blocking air flow between the split pipe and the opening; and
an annulus plate covering the foam wall gasket, wherein the annulus plate is positioned around the split pipe at the structural opening, wherein the annulus plate has two identical semicircular halves, each half having a catch pocket at one end and a locking mechanism at an opposite end, wherein the catch pocket has an opening for engaging the locking mechanism, wherein the locking mechanism has a retaining tab, a locking tab and a stabilizing tab, wherein the retaining tab and the locking tab oppose each other and deflect into locking engagement with the catch pocket.

32. The fire stop system of claim 31, wherein the split pipe has two identical halves, each half having a latch along one side and a pocket along an opposite side, wherein the latch of one half of the split pipe snap fits into the pocket of the other half of the split pipe.

33. The fire stop system of claim 31, wherein the first end and the second end of the split pipe have an edge with a rolled hem for providing a smooth transition for cables pulled through the split pipe.

34. The fire stop system of claim 31, wherein each half of the annulus plate has a plurality of outwardly extending tabs for receiving a fastener to secure the annulus plate to the split pipe.

35. The fire stop system of claim 31, wherein the annulus plate is a single circular member, wherein the annulus plate has a plurality of outwardly extending tabs for receiving a fastener to secure the annulus plate to the split pipe.

36. The fire stop system of claim 31, further comprising:
a hot sock installed around the split pipe, wherein the hot sock has a base and a top; and
a spring ring secured to the base of the hot sock, wherein the spring ring secures the hot sock to the split pipe.

* * * * *